United States Patent
Bracha et al.

(10) Patent No.: US 11,305,489 B2
(45) Date of Patent: Apr. 19, 2022

(54) 3D PRINTING SYSTEM FOR PRINTING HIGH MELTING TEMPERATURE MATERIALS

(71) Applicant: D. Swarovski KG, Wattens (AT)

(72) Inventors: Arik Bracha, Tel-Aviv (IL); Eran Gal-or, Kfar-Saba (IL)

(73) Assignee: D. Swarovski KG, Wattens (AT)

( * ) Notice: Subject to any disclaimer, the term of this patent is extended or adjusted under 35 U.S.C. 154(b) by 0 days.

(21) Appl. No.: 16/489,509

(22) PCT Filed: Feb. 26, 2018

(86) PCT No.: PCT/IB2018/051178
§ 371 (c)(1),
(2) Date: Aug. 28, 2019

(87) PCT Pub. No.: WO2018/163006
PCT Pub. Date: Sep. 13, 2018

(65) Prior Publication Data
US 2020/0070415 A1    Mar. 5, 2020

Related U.S. Application Data

(60) Provisional application No. 62/467,152, filed on Mar. 5, 2017.

(51) Int. Cl.
*B29C 64/209* (2017.01)
*B29C 64/245* (2017.01)
(Continued)

(52) U.S. Cl.
CPC .......... *B29C 64/209* (2017.08); *B29C 64/227* (2017.08); *B29C 64/245* (2017.08);
(Continued)

(58) Field of Classification Search
CPC ... B29C 64/209; B29C 64/245; B29C 64/295; B29C 64/227; B29C 64/371; B29C 64/321; C03B 19/00; C03B 19/02; C03B 19/025
See application file for complete search history.

(56) References Cited

U.S. PATENT DOCUMENTS 5,141,680 A * 8/1992 Almquist ................ B29C 41/12
264/401
5,772,835 A * 6/1998 Jordan ................ B29C 35/0238
156/358
(Continued)

FOREIGN PATENT DOCUMENTS

CN 205341923 U 6/2016
CN 105753299 A 7/2016
(Continued)

OTHER PUBLICATIONS

Chover Nimrod Israel; International Search Report and Written Opinion; International Application No. PCT/IB2018/051178; dated Jun. 18, 2018; Israel Patent Office; Jerusalem, Israel.
(Continued)

*Primary Examiner* — Niki Bakhtiari
*Assistant Examiner* — Emmanuel S Luk
(74) *Attorney, Agent, or Firm* — Stevens & Showalter LLP

(57) ABSTRACT

A 3D printing system, comprising a heated chamber; a printing base plate mounted inside the heated chamber; a cooling unit mounted outside and above the heated chamber; a printing nozzle; wherein the cooling unit is configured to surround the printing nozzle's upper side outside the heated chamber for cooling the printing nozzle's upper side and wherein the printing nozzle's lower side is mounted inside the heated chamber; and a nozzle heating unit mounted inside the heated chamber and around the printing nozzle's
(Continued)

lower side at a distance from the outer surface of the printing nozzle; the heating unit configured to heat the printing nozzle's lower side; the system configured to receive a printing material for printing a 3D model inside the heated chamber.

15 Claims, 3 Drawing Sheets

(51) Int. Cl.
- *B29C 64/295* (2017.01)
- *B29C 64/321* (2017.01)
- *B29C 64/227* (2017.01)
- *B29C 64/371* (2017.01)
- *B33Y 30/00* (2015.01)
- *B33Y 40/00* (2020.01)

(52) U.S. Cl.
CPC .......... *B29C 64/295* (2017.08); *B29C 64/321* (2017.08); *B29C 64/371* (2017.08); *B33Y 30/00* (2014.12); *B33Y 40/00* (2014.12)

(56) References Cited

U.S. PATENT DOCUMENTS

| | | | | |
|---|---|---|---|---|
| 2010/0171792 A1* | 7/2010 | Sidhu | ............... | B29C 64/106 347/44 |
| 2013/0168892 A1* | 7/2013 | Swanson | ............... | B29C 48/18 264/80 |
| 2014/0048970 A1* | 2/2014 | Batchelder | ............... | B29C 67/0055 264/129 |
| 2015/0183138 A1* | 7/2015 | Duty | ............... | B29C 48/02 264/427 |
| 2015/0307385 A1* | 10/2015 | Klein | ............... | C03B 17/00 65/29.11 |
| 2015/0314531 A1* | 11/2015 | Mark | ............... | B29C 64/106 264/241 |
| 2016/0194233 A1* | 7/2016 | Van Pelt | ............... | C03B 19/02 65/32.4 |
| 2016/0236408 A1* | 8/2016 | Wolf | ............... | B29C 64/209 |
| 2016/0271880 A1* | 9/2016 | Bheda | ............... | B29C 64/209 |
| 2017/0136540 A1* | 5/2017 | Dods | ............... | B23K 26/342 |
| 2017/0151704 A1* | 6/2017 | Go | ............... | B29C 64/209 |
| 2017/0173692 A1* | 6/2017 | Myerberg | ............... | B33Y 30/00 |
| 2017/0210068 A1* | 7/2017 | Ku | ............... | B33Y 10/00 |
| 2017/0266876 A1* | 9/2017 | Hocker | ............... | B29C 64/106 |
| 2017/0274454 A1* | 9/2017 | Feng | ............... | B22F 3/105 |
| 2017/0291841 A1 | 10/2017 | Inamura et al. | | |
| 2018/0027615 A1* | 1/2018 | Rios | ............... | B29C 64/106 219/603 |
| 2018/0111313 A1* | 4/2018 | Murao | ............... | B29C 64/236 |
| 2018/0324903 A1* | 11/2018 | Zeng | ............... | H05B 6/34 |
| 2018/0345573 A1* | 12/2018 | Zinniel | ............... | B29C 64/295 |
| 2018/0345577 A1* | 12/2018 | Takeyama | ............... | B29C 64/118 |
| 2019/0030602 A1* | 1/2019 | Sachs | ............... | B29C 64/118 |
| 2019/0118252 A1* | 4/2019 | Bauer | ............... | B22F 10/10 |
| 2019/0240730 A1* | 8/2019 | Haider | ............... | B22F 3/24 |
| 2020/0078859 A1* | 3/2020 | Cho | ............... | B33Y 30/00 |
| 2020/0368848 A1* | 11/2020 | Birmingham | ............... | B23K 26/702 |
| 2021/0016493 A1* | 1/2021 | Bracha | ............... | B22F 10/38 |

FOREIGN PATENT DOCUMENTS

| | | |
|---|---|---|
| CN | 106045283 A | 10/2016 |
| CN | 106116120 A | 11/2016 |
| CN | 106186644 A | 12/2016 |
| CN | 106363920 A | 2/2017 |
| WO | 0078519 A1 | 12/2000 |
| WO | 2017014457 A1 | 1/2017 |

OTHER PUBLICATIONS

Extended European Search Report dated Nov. 17, 2020; European Application No. 18764347; European Patent Office; Munich, Germany.

Search Report; Chinese Application No. 201880015266.X; dated Mar. 29, 2021; China National Intellectual Property Administration; Beijing, China.

Office Action; Chinese Application No. 201880015266.X; dated Apr. 2, 2021; China National Intellectual Property Administration; Beijing, China.

Huang Yijuan; Office Action; Chinese Application No. 201880015266X; dated Jan. 24, 2022; China National Intellectual Property Administration; Beijing, China.

* cited by examiner

3D PRINTING SYSTEM FOR PRINTING HIGH MELTING TEMPERATURE MATERIALS

CROSS-REFERENCE TO RELATED PATENT APPLICATIONS

This patent application claims priority from and is related to U.S. Provisional Patent Application Ser. No. 62/467,152, filed Mar. 5, 2017, this U.S. Provisional Patent Application incorporated by reference in its entirety herein.

FIELD OF THE INVENTION

The present invention generally relates to 3D printing systems and specifically to a printing system for printing 3D models inside a heating chamber.

BACKGROUND 3D printing or Additive Manufacturing (AM), Fuse Depositing Modeling (FDM) and Fused Filament Fabrication (FFT) refer to any of the various processes for printing a three-dimensional object. Primarily additive processes are used, in which successive layers of material are laid down under computer control. These objects can be of almost any shape or geometry, and are produced from a 3D model or other electronic data source. Different types of 3D printers were developed over the years, such as 3D FDM (Fused Deposition Modeling) extrusion printers. 3D FDM extrusion printers are mostly based on melting a filament, e.g. plastics or metals, in a printer head. The maximum melting temperature of such 3D printers is limited to around 400° C. due to the relative low melting temperature of materials used for the printer heads.

Various problems arise while printing glass and other high temperature melting materials. First, the heating unit has to be as close as possible to the nozzle's tip, otherwise the molten material cools down while flowing down towards the nozzle's exit (tip).

Second, when the printing material begins to soften, before it is transformed to a liquid state, it tends to bond to the nozzle. This phenomenon increases the pushing force required by the feeder in order to overcome the drag/friction and causes feeding failures such as printing material which may be stuck inside the nozzle.

Third, while printing with high melting temperature printing materials it is desirable to maintain a high temperature in the printing area in order to avoid cracks or breakages due to thermal stresses on the printed part.

There is a long felt need for a system enabling to solve these problems and print a 3D model with high melting temperature printing materials.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
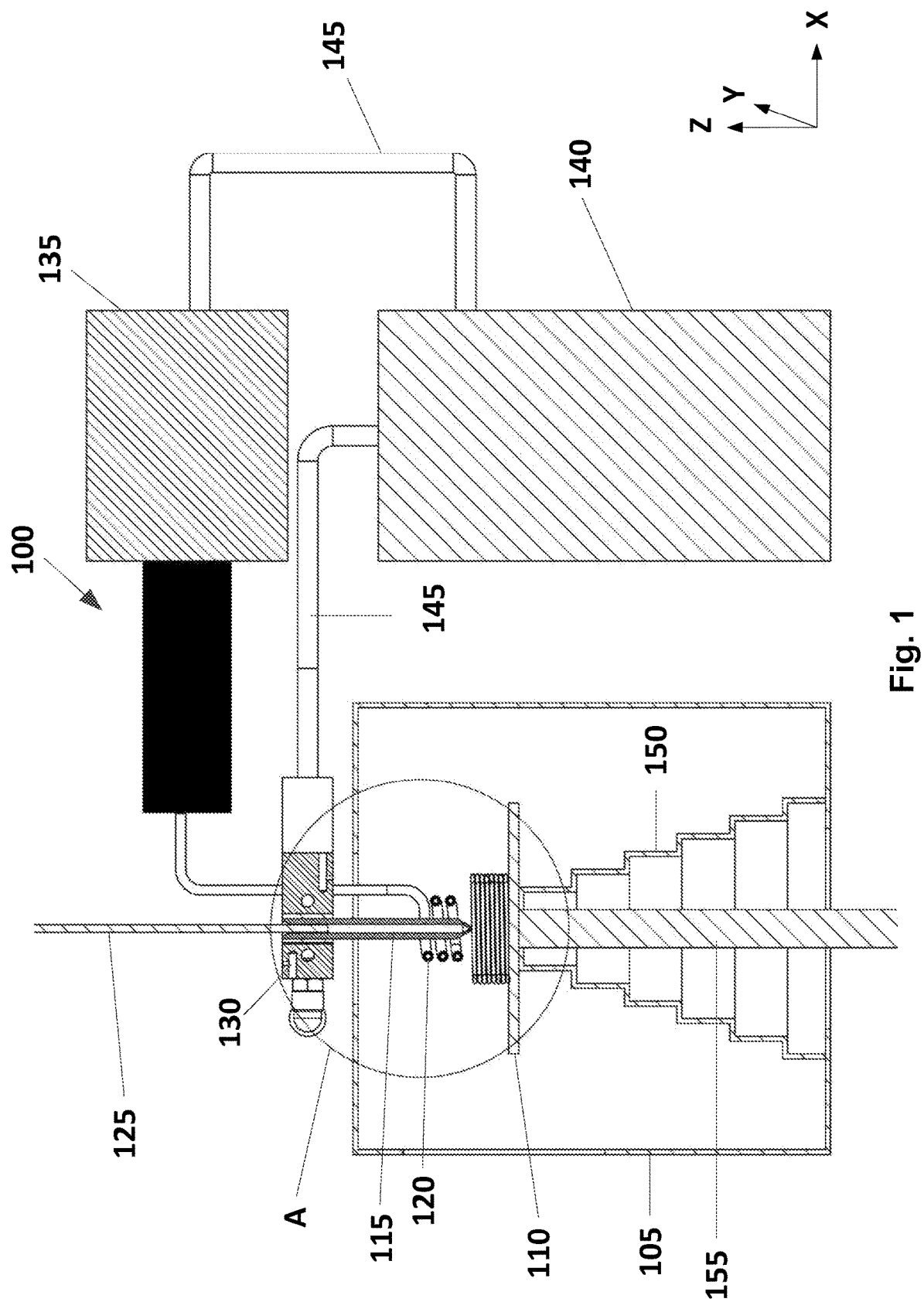
FIG. 1 is a cross section view of the printing system according to embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a system for 3D printing of glass, metal, ceramic or any other printing material requiring high melting temperature. Throughout the description, these materials may be referred to as printing material(s).

While printing with such high melting temperature printing materials it is desirable to maintain a high temperature in the printing area in order to avoid cracks or breakages due to thermal stresses on the printed part. For that reason, the system of the present invention prints inside a heated chamber or a furnace.

It should be clear that there are two separate heating systems in the printing system. The first heating system heats the printing environment, namely, the heated chamber, for example by an electric heating, and the second heating system is a printing nozzle heating unit, e.g., an induction coil intended to heat the printing nozzle for melting the printing material.

In such a printing system where the printing nozzle is heated to a high temperature e.g., more than 1000 deg C., and the whole printing environment is at high temperatures as well e.g., 200-800 deg C. (depending on the printing material), the heating unit of the nozzle (e.g., the induction coil) is exposed to tremendous heat by convection and radiation. Therefore, the straight forward solution would have been to install the printing nozzle and the nozzle's heating unit outside the heated chamber while the nozzle's tip is mounted inside the heated chamber. In practice, this solution does not work well because at such high temperatures (e.g., 1000 deg C.) the molten material cools down while flowing down towards the nozzle's exit (tip). Therefore, the heating unit has to be as close as possible to the nozzle's tip, namely, inside the heated chamber/furnace.

Moreover, when the printing material begins to soften, before it is transformed to a liquid state, it tends to bond to the nozzle. This area is also called a "softening zone". This phenomenon increases the pushing force required by the feeding mechanism in order to overcome the drag/friction and causes feeding failures such as printing material which may stick inside the nozzle.

A nozzle cooling unit surrounding the upper side of the printing nozzle is intended to prevent overflow. If the upper side of the nozzle will not be cool enough, the melted printing material will overflow to the upper side of the nozzle instead of being pushed down towards the nozzle's exit.

Although it may seem unconventional to cool the upper side of the nozzle and heat the lower side of the nozzle at the same time, it is necessary for enabling extruding while preventing overflow and reducing the force needed from the feeding mechanism.

The system of the present invention solves these issues by installing the printing nozzle in such a way that the hot side (the lower side) of the nozzle, through which the printing material melts and flows towards the nozzle exit, is mounted inside the heated chamber. The printing nozzle heating unit (e.g., induction heating coil) that heats the nozzle and melts the printing material is also installed inside the heated chamber, as close as possible to the nozzle exit (tip). A liquid/gas chiller provides liquid/gas to a nozzle cooling unit which is installed at the upper side of the nozzle, outside the heated chamber and, according to embodiments of the invention, also acts as the nozzle mechanical mounting platform to which the nozzle is connected. The liquid/gas chiller may also provide liquid/gas for cooling the heating unit (induction coil) and preventing it from melting. According to embodiments of the invention, two separate liquid/gas cooling chillers may be used.

The present invention's solution involves a tremendous temperature gradient along the printing nozzle on a relatively short piece of nozzle. The border between the hot side of the nozzle and the cold side of the nozzle is the heated chamber.

FIG. 1 is a cross section view of the 3D printing system 100 according to embodiments of the present invention, comprising: a heated chamber/furnace 105; a plate/substrate 110 mounted inside the heated chamber 105 for the 3D printed model to be printed on; a printing nozzle 115 mounted partially inside the heated chamber 105; a nozzle heating unit (an induction coil) 120 mounted inside the heated chamber 105 and around the lower side of the nozzle 115 at a distance from the outer surface of the nozzle 115 for heating the nozzle; a printing material rod or spool 125; a nozzle cooling unit 130 mounted outside the heated chamber 105 and surrounding the upper side of the nozzle 115 for cooling the upper side of the nozzle; an induction machine 135 for activating the induction coil 120; a fluid/gas chiller 140 connected with the induction machine 135 and the cooling unit 130 via pipes 145 for providing fluid/gas for cooling the upper side of the nozzle 115 and the induction coil 120; and a printer controller (not shown) for controlling the 3D printing system 100. According to embodiments of the invention, an opening at the bottom of the heated chamber that enables an XYZ movement of the printing plate/substrate is covered by a thermal insulation blanket 150 in order to insulate the heated chamber from the surrounding.

It will be appreciated that the nozzle heating unit 120 is not limited to an induction coil.

The printing material rod or spool 125 is intended to be pushed by a feeding mechanism (not shown) from the upper cold side of the nozzle 115 towards the lower hot side of the nozzle 115 and heated and melted while passing through the nozzle that is heated by the heating unit 120. It will be appreciated that the system of the present invention is not limited to a specific feeding mechanism.

The induction coil 120 is connected to the induction machine 135 which provides a variable frequency voltage supply. Once the machine is activated, a current through the coil 120 creates an electromagnetic field which heats the nozzle 115. By applying sufficient power across the coil, the printing nozzle 115 reaches a temperature at which the printing material, e.g., glass filament passing through, is melted.

Figure 1A:
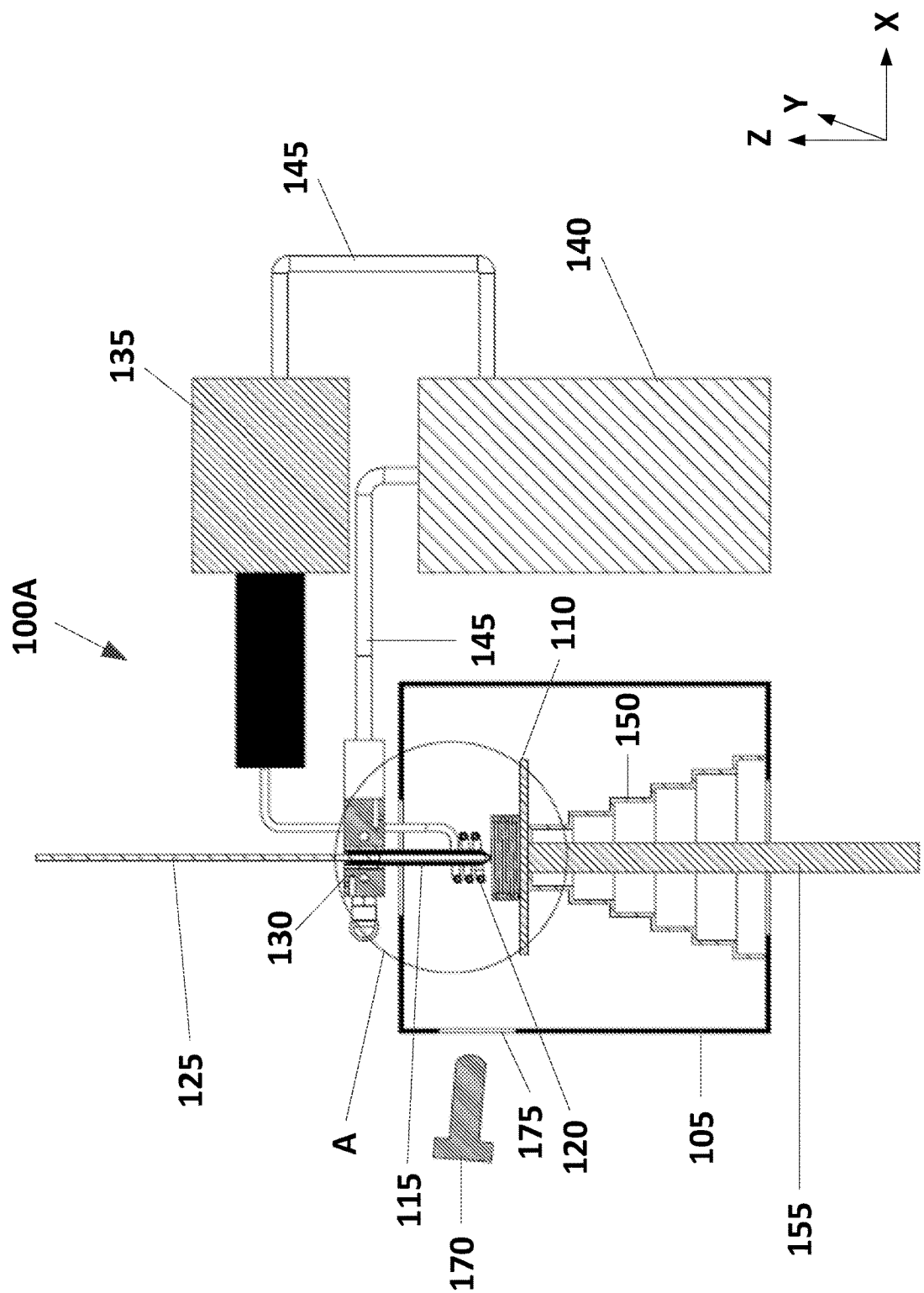
FIG. 1A is a cross section view of another printing system according to embodiments of the present invention.

According to embodiments of the present invention, the 3D printing system of FIG. 1 may also comprise a temperature measurement device 170 such as presented in the 3D printing system 100A of FIG. 1A. The temperature measurement device 170 is mounted outside the heated chamber 105 and directed, through a window 175 in the side wall of the heated chamber, to the printing nozzle's 115 tip. The temperature measurement device 170 may be a pyrometer, an IR camera or any other temperature measuring device capable of measuring the printing nozzle's 115 tip temperature. According to embodiments of the present invention, the printer controller continuously or periodically receives temperature measurements from the temperature measurement device 170 and changes the power accordingly.

In a case where a different nozzle heating unit is used, the printer controller may change the power supply to that heating unit accordingly.

Figure 2:
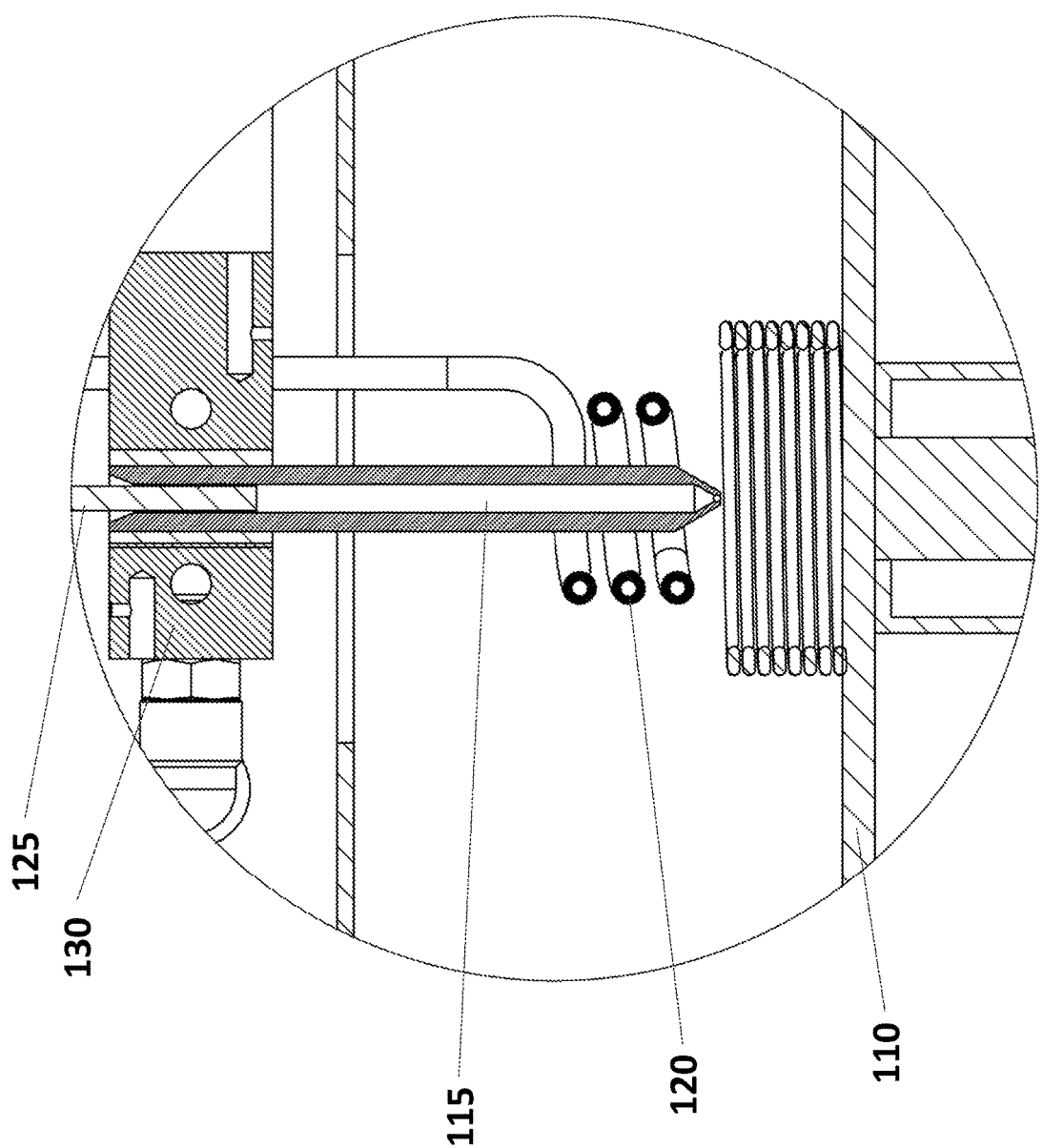
FIG. 2 is a cross section enlargement of item "A" of FIG. 1.

FIG. 2 is a cross section enlargement of item "A" of FIG. 1.

According to embodiments of the invention, the nozzle is made from metals that can withstand high temperatures such as inconel, platinum or any other refractory metal.

According to embodiments of the invention, with some printing materials, it is desirable to insert a sleeve inside the printing nozzle, for example, a boron nitride sleeve, in order to reduce the friction/drag required by the feeder, where the printing material passes through the sleeve.

According to embodiments of the invention, while printing specific materials, inert gas e.g. argon, may be pumped into the heated chamber. Alternatively, instead of pumping inert gas, a vacuum pump may suck the air out of the heated chamber. This is done in order to avoid corrosion of the printing material and/or the printing nozzle, caused by oxygen.

According to embodiments of the invention, it will be appreciated that the system 100 may use any printing method including fixed printing nozzle and moving XY(Z) substrate, where the substrate is positioned under the printing nozzle; moving XY(Z) printing nozzle and fixed substrate or a combination of moving printing nozzle and moving substrate. It will be appreciated that if the printing nozzle is a moving nozzle, the induction coil and the nozzle cooling unit have to move accordingly in order to maintain their relative position from the nozzle. It may be achieved by using flexible pipes (145) enabling the induction coil and the nozzle cooling unit to move along with the nozzle or by moving the induction coil, the induction machine, the nozzle cooling unit and the chiller along with the nozzle.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A 3D printing system, comprising:
   a heated chamber;
   a printing base plate mounted inside said heated chamber;
   a cooling unit mounted outside and above said heated chamber;
   a printing nozzle having an upper side and a lower side including a nozzle tip;
   wherein said cooling unit is configured to surround said printing nozzle's upper side outside said heated chamber for cooling said printing nozzle's upper side and wherein said printing nozzle's lower side is mounted inside said heated chamber;
   a nozzle heating unit mounted inside said heated chamber and around said printing nozzle's lower side adjacent the nozzle tip and at a distance from an outer surface of said printing nozzle;
   wherein said heating unit is configured to heat said printing nozzle's lower tip to a temperature of more than 1000° C. and said cooling unit is configured to cool said upper side of said printing nozzle to less than 200° C. such that a high temperature gradient is established, in use, along the length of the printing nozzle, wherein said heating unit is an induction coil;
   an induction machine configured to activate said induction coil and further comprising a fluid/gas chiller connected with said induction machine and said cooling unit for providing one of fluid and gas;
   said 3D printing system configured to receive a printing material for printing a 3D model inside said heated chamber;
   a temperature measurement device mounted outside said heated chamber and directed, through a window in the side wall of said heated chamber, to a tip of the printing nozzle; said temperature measurement device configured to measure said printing nozzle tip's temperature; and
   a power source to provide power to said nozzle heating unit, and a printer controller configured to continuously or periodically receive temperature measurements from said temperature measurement device and change the power provided to said nozzle heating unit accordingly.

2. The 3D printing system of claim 1, wherein said printing material is formed as one of a rod and a spool.

3. The 3D printing system of claim 2, further comprising a feeding mechanism configured to feed said one of rod and spool into said printing nozzle's upper side.

4. The 3D printing system of claim 1, wherein said printing material is one of glass, metal and ceramic.

5. The 3D printing system of claim 1, wherein said printing nozzle is made from one of inconel and platinum.

6. The 3D printing system of claim 1, wherein said temperature measurement device comprises one of a pyrometer and IR camera.

7. The 3D printing system of claim 1, wherein said heated chamber has a bottom, and further comprises an opening at the bottom of the heated chamber configured to enable movement of said printing base plate; and wherein said 3D printing system further comprises a thermal insulation blanket configured to cover said opening for insulating said heated chamber from said heated chamber's surrounding.

8. The 3D printing system of claim 1, wherein said printing nozzle's upper side is connected with said cooling unit.

9. The 3D printing system of claim 1, wherein said printing base plate is a movable plate and said printing nozzle is fixed.

10. The 3D printing system of claim 1, wherein said printing base plate and said printing nozzle are movable; wherein said cooling unit and said nozzle heating unit are configured to move along with said printing nozzle.

11. The 3D printing system of claim 1, wherein said printing base plate is fixed and said printing nozzle is movable; wherein said nozzle cooling unit and said nozzle heating unit are configured to move along with said printing nozzle.

12. The 3D printing system of claim 1, further comprising a boron nitride sleeve configured to be mounted inside said printing nozzle.

13. The 3D printing system of claim 1, further configured to pump inert gas into said heated chamber.

14. The 3D printing system of claim 1, further configured to suck air out of said heated chamber.

15. The 3D printing system of claim 1, wherein said printing nozzle, said nozzle cooling unit and said nozzle heating unit are movable; and said nozzle cooling unit and said nozzle heating unit are configured with flexible pipes to enable them to maintain their position relative to said printing nozzle.

* * * * *